United States Patent
Vajravel et al.

(10) Patent No.: US 11,650,860 B2
(45) Date of Patent: May 16, 2023

(54) MANAGING SERVICES ACROSS CONTAINERS

(71) Applicant: Dell Products L.P., Round Rock, TX (US)

(72) Inventors: Gokul Thiruchengode Vajravel, Bangalore (IN); Vivek Viswanathan Iyer, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 52 days.

(21) Appl. No.: 17/391,993

(22) Filed: Aug. 2, 2021

(65) Prior Publication Data
US 2023/0036532 A1    Feb. 2, 2023

(51) Int. Cl.
*G06F 3/00* (2006.01)
*G06F 9/54* (2006.01)
*G06F 9/46* (2006.01)

(52) U.S. Cl.
CPC ............... *G06F 9/54* (2013.01); *G06F 9/466* (2013.01)

(58) Field of Classification Search
CPC ......................................................... G06F 9/54
USPC ......................................................... 719/328
See application file for complete search history.

(56) References Cited

U.S. PATENT DOCUMENTS

| | | | | |
|---|---|---|---|---|
| 8,271,996 | B1 * | 9/2012 | Gould | G06F 9/542 719/330 |
| 9,804,952 | B1 * | 10/2017 | Cohen | G06F 11/366 |
| 10,592,318 | B2 * | 3/2020 | Christy Jesuraj | G06F 9/54 |
| 2017/0185327 | A1 * | 6/2017 | Powell | G06F 3/061 |
| 2017/0371567 | A1 * | 12/2017 | Piduri | G06F 3/065 |
| 2019/0325058 | A1 * | 10/2019 | Srivastava | G06F 9/44526 |

FOREIGN PATENT DOCUMENTS

| | | | | |
|---|---|---|---|---|
| CN | 108694117 | A * | 10/2018 | ......... G06F 11/3664 |
| CN | 109669722 | A * | 4/2019 | ......... G06F 11/0772 |
| CN | 111930588 | | * 11/2020 | |
| JP | 2002132542 | A * | 5/2002 | |
| JP | 6259935 | B2 * | 1/2018 | ............ G06F 16/11 |
| WO | WO-2019177791 | A1 * | 9/2019 | ............ G06F 16/13 |

OTHER PUBLICATIONS

Jinqiu Yang, Towards Extracting Web API Specifications from Documentation. (Year: 2018).*
Tianlong Yu, FreeFlow: High Performance Container Networking. (Year: 2016).*

* cited by examiner

*Primary Examiner* — Lechi Truong
(74) *Attorney, Agent, or Firm* — Kirton McConkie; Brian Tucker (57) ABSTRACT

Services can be managed across containers. A management service can obtain or compile configuration information for containerized applications and containerized services that are hosted on a computing device. The configuration information can define how a containerized application is dependent on a containerized service. Using the configuration information, the management service can establish data paths between containers to enable container services running in the containers to perform cross-container communications by which a containerized application in one container can access a containerized service in another container. The management service may also enable a container service to perform communications by which a containerized application can access services provided by the host operating system.

20 Claims, 8 Drawing Sheets

MANAGING SERVICES ACROSS CONTAINERS

CROSS-REFERENCE TO RELATED APPLICATIONS

N/A

BACKGROUND

Figure 1:
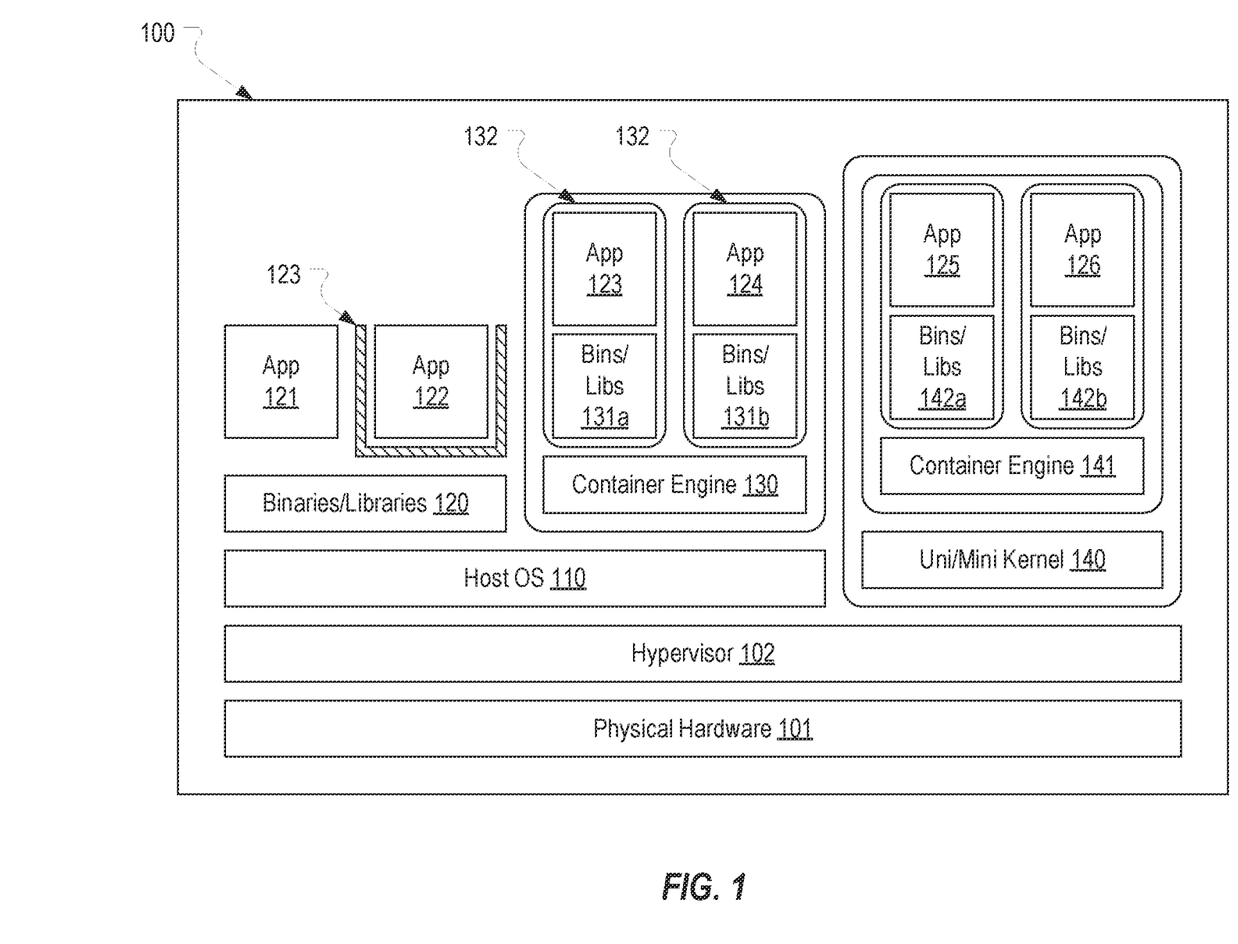
FIG. 1 provides examples of various types of containers that can be used to host an application or a service on a computing device.

Containerization in the software context refers to a technique for packaging an application and its dependencies into a container to abstract/isolate the application from the underlying host operating system and environment. A number of containerization techniques exist. FIG. 1 represents a computing device 100 that has physical hardware 101, a hypervisor 102 and a host operating system 120. Application 121 is an example of an application that is not containerized in that it relies on binaries/libraries 120 to interface directly with host operating system 110. In contrast, application 122 represents an application that is executed in a first type of container in which containerization is implemented using access control mechanisms 123. Examples of solutions that implement containerization through access control mechanisms 123 include Security-Enhanced Linux (SELinux) and AppArmor.

Applications 123 and 124 represent examples of applications that are executed in a second type of container in which containerization is implemented using software virtualization. Examples of solutions that implement containerization through software virtualization (or "software containers") include Docker and FreeBSD Jails. As represented in FIG. 1, each application 123 and 124 and its binaries/libraries 131a and 131b may be isolated within its own container 132 that is executed via a container engine 130 that runs on host operating system 110. Variations of this second type of container include Intel Software Guard Extensions (SGX) and Arm TrustZone which containerize an application within a secure region of memory.

Applications 125 and 126 represent examples of applications that are executed in a third type of container in which containerization is implemented using hardware virtualization (e.g., via a virtual machine). Examples of solutions that implement containerization through hardware virtualization (or "hardware containers") include Kata Containers, Hyper-V Docker and Qubes OS. As represented in FIG. 1, with this third type of container, a uni/mini kernel 140 is executed on hypervisor 102. A container engine 141 may then be run on uni/mini kernel 140 to containerize applications 125 and 126 and their respective binaries/libraries 142a and 142b.

Although not represented in FIG. 1, it is even possible to combine multiple types of containerization solutions. For example, Docker may be used with SELinux to execute an application. As another example, Graphene combines software enclaves (e.g., Intel SGX) with hardware virtualization (e.g., via a unikernel). Accordingly, there is a wide variety of container modes for executing an application.

When an application is containerized, it will only have access to services that are bundled and deployed with the application in the container. For example, if Zoom is containerized, it would not have access to the PulseAudio, OpenGL/CL, or other multimedia-based services/APIs that would otherwise be available on the computing device unless such services were deployed in the same container. Because of this requirement, the size of the container may be substantially larger. If multiple containers rely on the same services, the redundant bundling of the services in multiple containers can quickly consume resources on the computing device. Similarly, many services provided by the host operating system cannot be bundled and deployed in a container and will therefore not be available to a containerized application. In short, it currently is not feasible, if even possible, to isolate applications and services in their own separate containers.

BRIEF SUMMARY

The present invention extends to systems, methods and computer program products for managing services across containers. A management service can obtain or compile configuration information for containerized applications and containerized services that are hosted on a computing device. The configuration information can define how a containerized application is dependent on a containerized service. Using the configuration information, the management service can establish data paths between containers to enable container services running in the containers to perform cross-container communications by which a containerized application in one container can access a containerized service in another container. The management service may also enable a container service to perform communications by which a containerized application can access services provided by the host operating system.

In some embodiments, the present invention may be implemented as a method for managing services across containers. A first containerized application that is hosted in a first container may be identified. A containerized service that is hosted in a second container may also be identified. It can be determined that the first containerized application is dependent on the containerized service. A data path can be created between the first container and the second container to thereby enable the first containerized application to use the containerized service.

In some embodiments, the present invention may be implemented as computer storage media storing computer executable instructions which when executed implement a method for managing services across containers. Configuration information can be obtained which identifies a first containerized application running in a first container and one or more APIs on which the first containerized application is dependent. The one or more APIs are provided by a containerized service running in a second container. A container service running in the first container can be provided with an identification of the one or more APIs and data path information for a data path by which the container service can communicate with a second container service running in the second container. In response to the first containerized application invoking a first API of the one or more APIs, the container service running in the first container can send a communication via the data path to the second container service running in the second container. The communication identifies the first API.

In some embodiments, the present invention may be implemented as a method for managing services across containers. It can be determined that a first containerized application running in a first container is dependent on a service that is not running in the first container. A container service running in the first container can be provided with an identification of one or more APIs that the service provides and data path information for a data path by which the container service can request that the one or more APIs be invoked.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

In this specification and the claims, the term "computing device" should be construed as any computing device that is capable of executing an application within a container. Examples of computing devices include a desktop, laptop, thin client or tablet. The term "container" should be construed as encompassing, while not being limited to, the various examples of containers described in the background. The terms "containerized application" and "containerized service" should be construed as encompassing any application or service respectively that is deployed in a container.

Figure 2:
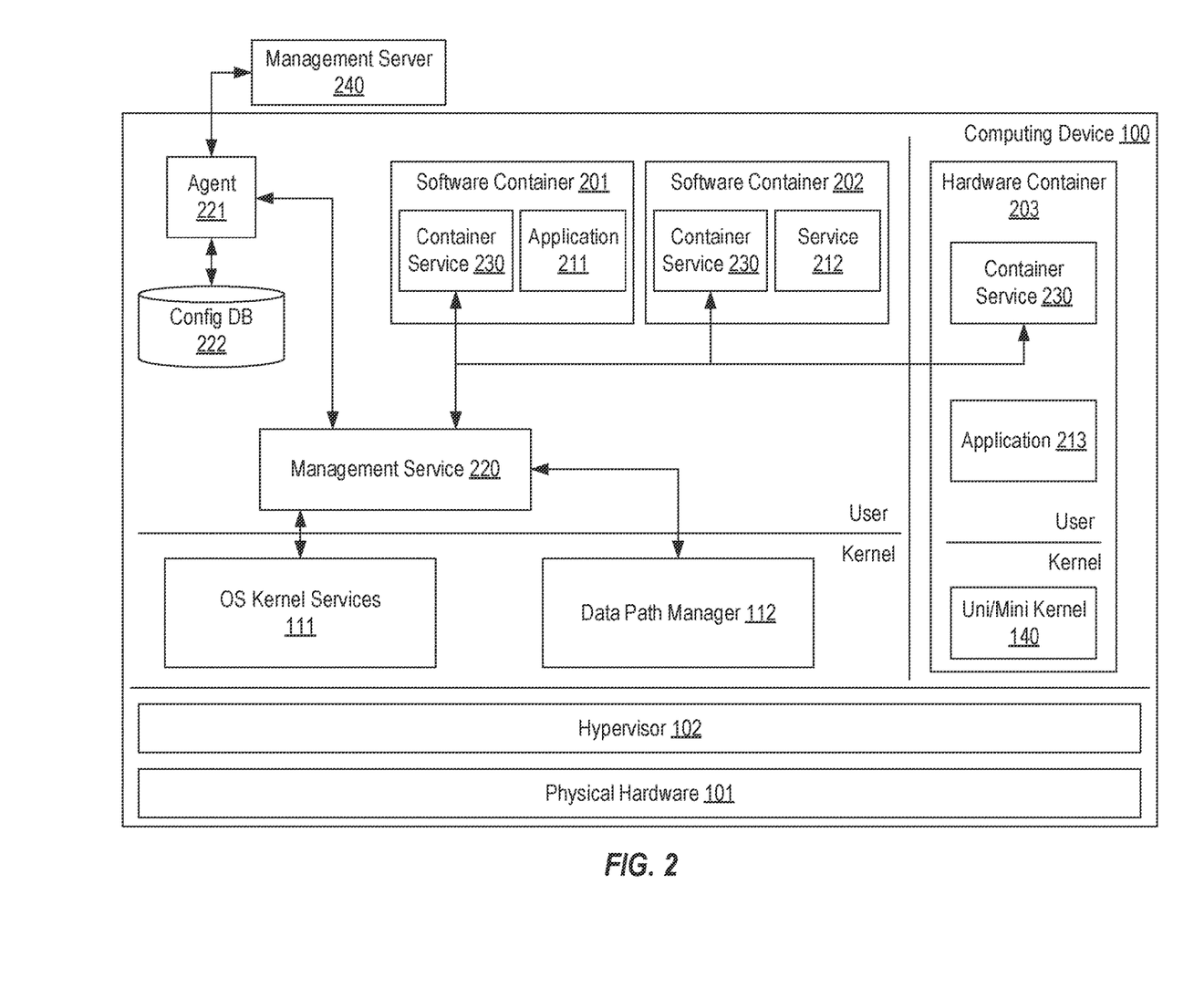
FIG. 2 provides an example of various components that can be employed on a computing device to enable one or more embodiments of the present invention to be implemented.

FIG. 2, which is based on FIG. 1, illustrates various components that can be included on computing device 100 to enable embodiments of the present invention to be implemented. As introduced in the background, computing device 100 includes physical hardware 101, possibly a hypervisor 102 (e.g., if hardware containers are to be deployed on computing device 100) and host OS 110 which can include OS kernel services 111 and a data path manager 112.

In accordance with embodiments of the present invention, a management service 220 can be deployed on computing device 100 and may, in some embodiments, interface with an agent 221 to obtain configuration information from a management server 240. For example, agent 221 could periodically receive applicable configuration information from management server 240 and store it in configuration database 222. In such cases, management service 220 may retrieve the configuration information from configuration database 222 either directly or via agent 221.

In the depicted example, it is assumed that three containers have been deployed on computing device 100: software container 201 for hosting application 211, software container 202 for hosting service 212 and hardware container 203 for hosting application 213. However, embodiments of the present invention should not be limited to any particular type, number or combination of containers that may be deployed on computing device 100 at any given time. Of importance is that an instance of container service 230 may be included in any container that may be deployed on computing device 100 (or at least in any container that participates in embodiments of the present invention).

Management service 220 can be configured to detect when a container is deployed on computing device 100 and, in response, to establish a connection with the instance of container service 230 running in the container. As one example only, management service 220 and each instance of container service 230 can be configured to communicate with an external connection coordinator (not shown) to provide connection information (e.g., an IP address and port number). Management service 220 and container services 230 can then use the connection information to establish connections for communicating as described herein. However, management service 220 and container services 230 could use any suitable technique for communicating.

As an overview, management service 220 can be configured to obtain or compile "configuration information" for containers that are or may be deployed on computing device 100. This configuration information can identify the containerized applications or services, whether they are consumers or providers, what their dependencies or exports are, the type of container in which they are deployed, etc. Using this configuration information, management service 220 can automatically create data paths between containers by which the instances of container service 230 running in the containers can intercommunicate for the purpose of providing a consumer containerized application with access to a provider containerized service in a separate container. Management service 220 may leverage data path manager 112 to establish such data paths.

Data path manager (or managers) 112 may represent components that provide mechanisms for creating data paths between the possibly different types of containers that may be deployed on computing device 100. For example, if software containers 201 and 202 are Docker containers, data path manager 112 can represent components that implement a Docker ambassador (or a container that implements a reverse proxy) for enabling external communication with each of software containers 201 and 202. As another example, if hardware container 203 is implemented using a Hyper-V virtual machine, data path manager 112 can represent components that implement Hyper-V hypercalls and management service 220 can use such hypercalls when establishing a data path with application 213.

Management service 220 can interface with data path manager 112 to create the necessary components (e.g., ambassadors, hypercalls or other technique) to enable a consumer containerized application in one container to seamlessly use a provider containerized service in another container via the respective container services 230. For example, management service 220 can use data path manager 112 to create ambassadors for enabling application 211 to use APIs provided by service 212. As another example, management service 220 can use data path manager 112 to create an ambassador and one or more hypercalls for enabling application 213 to use service 212. Accordingly, what data path manager 112 specifically represents and how management service 220 specifically uses data path manager 112 is dependent on the type of containers between which a data path is to be established.

In some embodiments, management service 220 may also enable containerized applications (or possibly containerized services) to access OS kernel services 111. For example, management service 220 can be configured to identify OS kernel services 111 (e.g., any software- or hardware-based services to which host operating system 110 provides access) and can establish data paths for enabling containerized applications to use OS kernel services 111. Given that OS kernel services 111 will be directly accessible to management service 220, management service 220 may function as one endpoint of such data paths and may use data path manager 112 as described above for creating the other endpoint. Alternatively, management service 220 and container service 230 could directly communicate to enable a containerized application to access OS kernel services 111.

Figure 3:
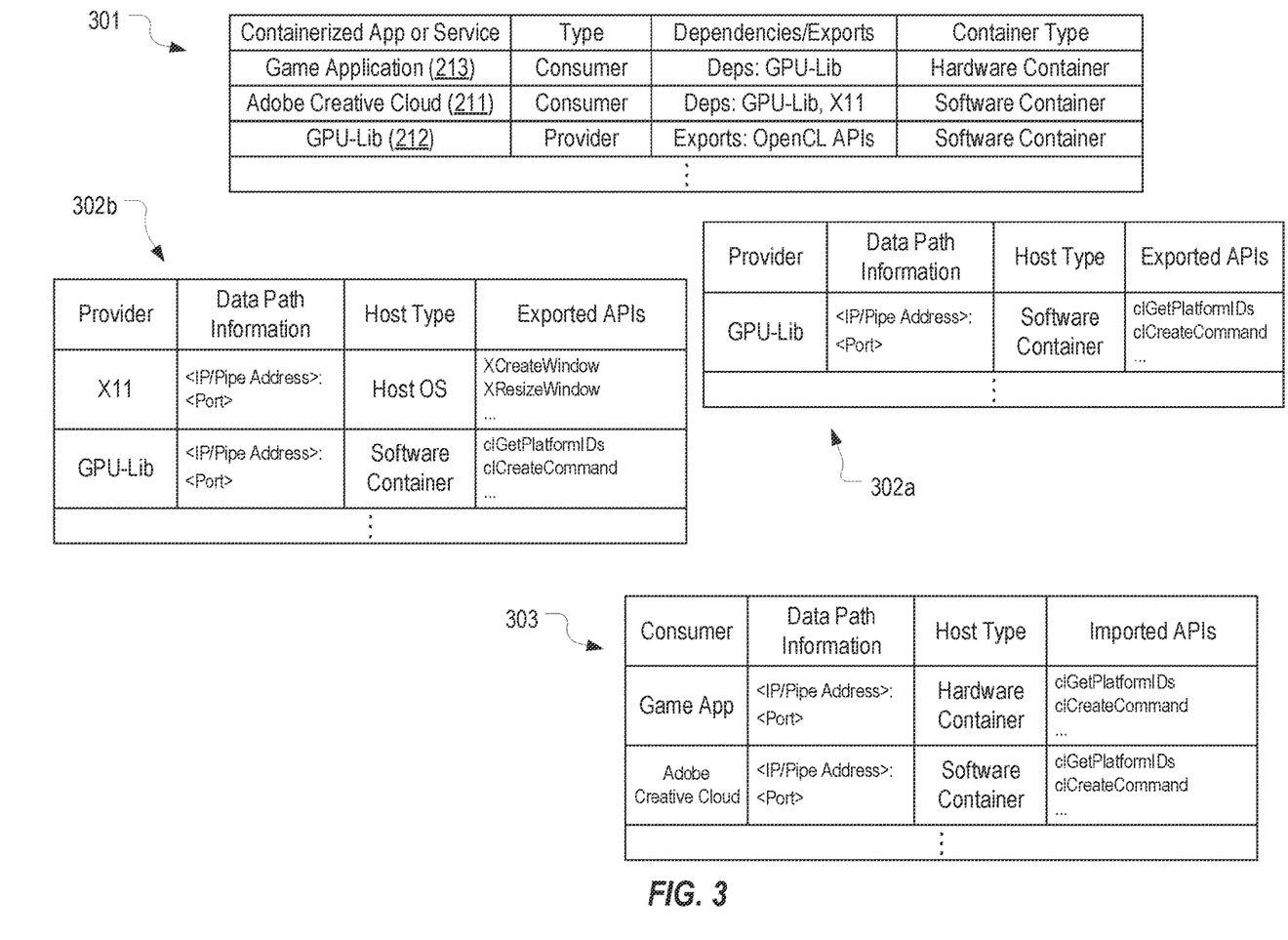
FIG. 3 provides examples of data structures that may be used in one or more embodiments of the present invention.

FIG. 3 provides examples of various data structures that may be used to implement one or more embodiments of the present invention. Table 301 provides an example of the type of configuration information that management service 220 may obtain or compile to determine which data paths it should establish to enable a consumer containerized application to use a provider containerized service that is not hosted in the same container (including containerized services hosted in other containers such as service 212 and OS kernel services 111). This configuration information can include an identification of a containerized application or service, whether the containerized application or service is a consumer or a provider, the dependencies or exports of the containerized application or service and the type of the container in which the containerized application or service is hosted, among possibly other information.

Table 301 includes a first example entry for a game application, which is assumed to be application 213 in hardware container 203, that is a consumer and depends on the GPU-Lib service which is assumed to be service 212. Table 302 also includes a second example entry for Adobe Creative Cloud, which is assumed to be application 211 in software container 201, that is a consumer and is dependent on the GPU-Lib service and the X11 service, which is assumed to be part of OS kernel services 111. Table 301 further includes a third example entry for the GPU-Lib service, which is assumed to be service 212 in software container 202, that is a provider and exports a number of OpenCL APIs.

Figure 4:
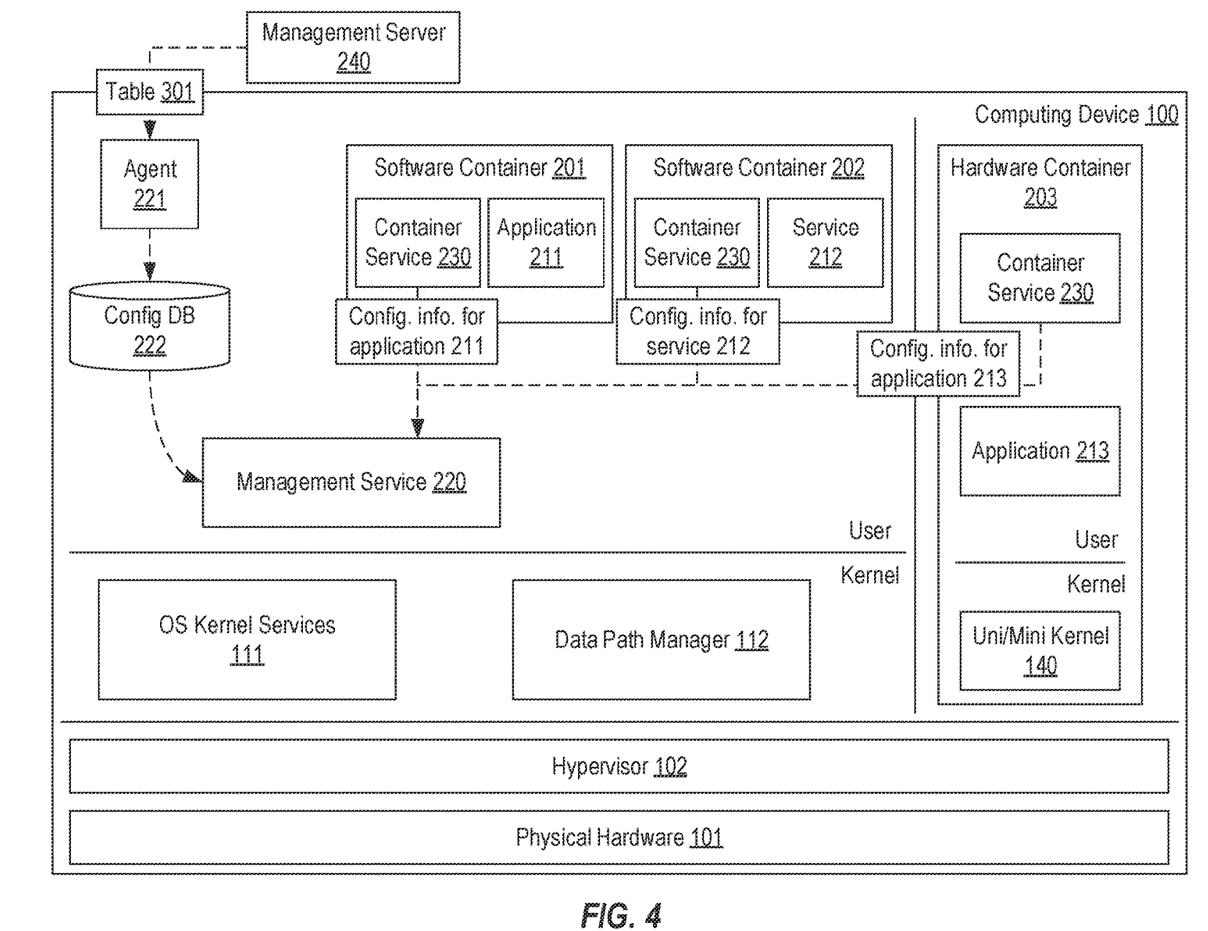
FIG. 4 provides an example of how a management service 220 can obtain or compile configuration information managing services across containers.

As represented in FIG. 4, management service 220 could obtain the configuration information of table 301 in different ways. In some embodiments, all or a portion of the configuration information contained in table 301 could be provided by management server 240 and stored in configuration database 222. For example, an administrator could generate the configuration information and use management server 240 to push it to agent 221 running on a group of computing devices 100. In some embodiments, the configuration information pertaining to a particular containerized application or service (or information from which the configuration information can be derived) could be collected by the respective instance of container service 230. In some embodiments, management service 220 may first obtain table 301 from configuration database 222 and determine whether it lacks configuration information for any containerized application or service and, if so, communicate with the respective container service 230 to obtain/compile the configuration information.

In instances where container service 230 collects the configuration information for a containerized application or service, it may do so using a variety of techniques. For example, in some embodiments, container service 230 may be configured to determine whether a containerized application or service is a consumer or a provider (e.g., by determining whether X11 redirection is enabled in the container, whether an interactive security ID is assigned to the container or other suitable technique for determining whether the containerized application or service has a GUI). If container service 230 determines that the containerized application or service is a consumer, it can then determine the containerized application's or service's dependencies (e.g., by examining its import address table and/or its manifest file to determine which APIs it uses). In contrast, if container service 230 determines that the containerized application or service is a provider, it can then determine the containerized application's or service's exports (e.g., by examining its export address table and/or its manifest file to determine which APIs it exposes). In either case, container service 230 can relay the collected configuration information to management service 220 via the established connection to allow management service 220 to populate table 301 for each containerized application or service deployed on computing device 100.

Regardless of how management service 220 obtains the configuration information, it may ultimately have the configuration information for each containerized application or service that is deployed (or that may be deployed) on computing device 100. With this configuration information, management service 200 can know which containerized applications or services are consumers and therefore require access to providers, as well as in which containers such providers are deployed. With this knowledge, management service 220 can determine which data paths to establish. For example, with reference to table 301 in FIG. 3, management service 220 can determine that a data path should be established between hardware container 203 and software container 202 to thereby enable the instances of container service 230 executing therein to intercommunicate. Similarly, management service 220 can determine that a data path should be established between software container 201 and software container 202 to thereby enable the instances of container service 230 executing therein to intercommunicate.

FIGS. 5A-5D provide an example of how management service 220 may establish data paths between containers and how the respective container services 230 can use the data paths to enable a consumer containerized application or service to access a provider containerized application or service. In this example, it is assumed that management service 220 has already obtained/compiled the configuration information in table 301 as shown in FIG. 3.

Figure 5A:
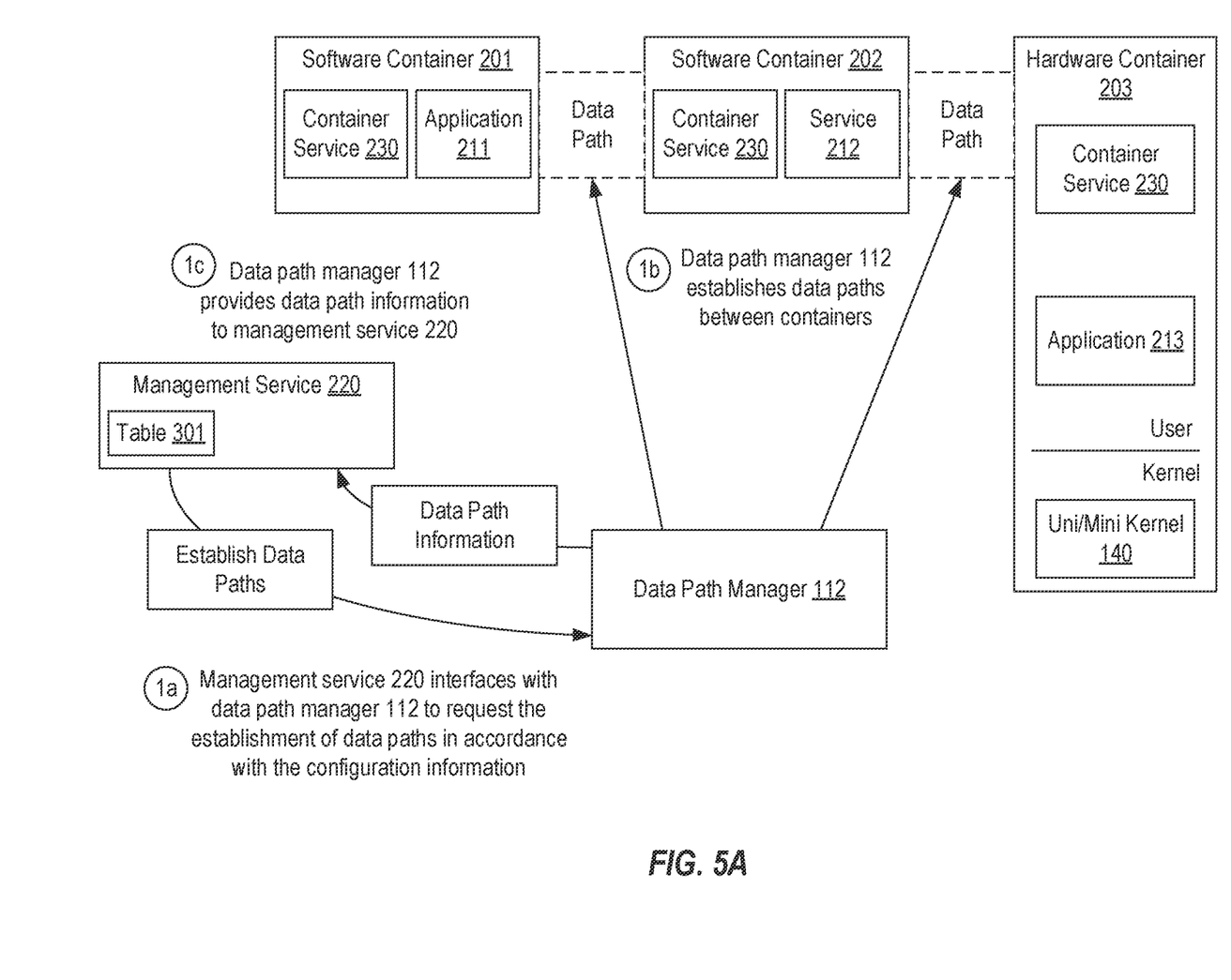
FIGS. 5A-5D provide examples of how services can be managed across containers.

Turning to FIG. 5A, in step 1a, management service 220 can interface with data path manager 112 to request the establishment of data paths in accordance with the configuration information. For example, in response to determining that application 211 is a consumer of (or is dependent upon) service 212 and that both application 211 and service 212 are hosted in software containers, management service 220 may request that data path manager 112 establish ambassadors for software containers 201 and 202. Similarly, in response to determining that application 213 is a consumer of service 212 and is hosted in a hardware container, management service 220 may request that data path manager 112 use hypercalls to establish a data path between hardware container 203 and software container 202 (e.g., leveraging the same ambassador created for software container 202). In step 1b, data path manager 112 can create the data paths as requested by management service 220. In step 1c, data path manager 112 can provide data path information to management service 220. This data path information can represent any information necessary for communicating via the established data paths. For example, the data path information could include IP addresses and port numbers or pipe addresses where the endpoints of the data paths can be reached. Accordingly, after step 1c, management service 220 will have established appropriate mechanisms to enable cross-container communications (i.e., the data paths) and will know the information for using such mechanisms to communicate (i.e., the data path information).

Figure 5B:
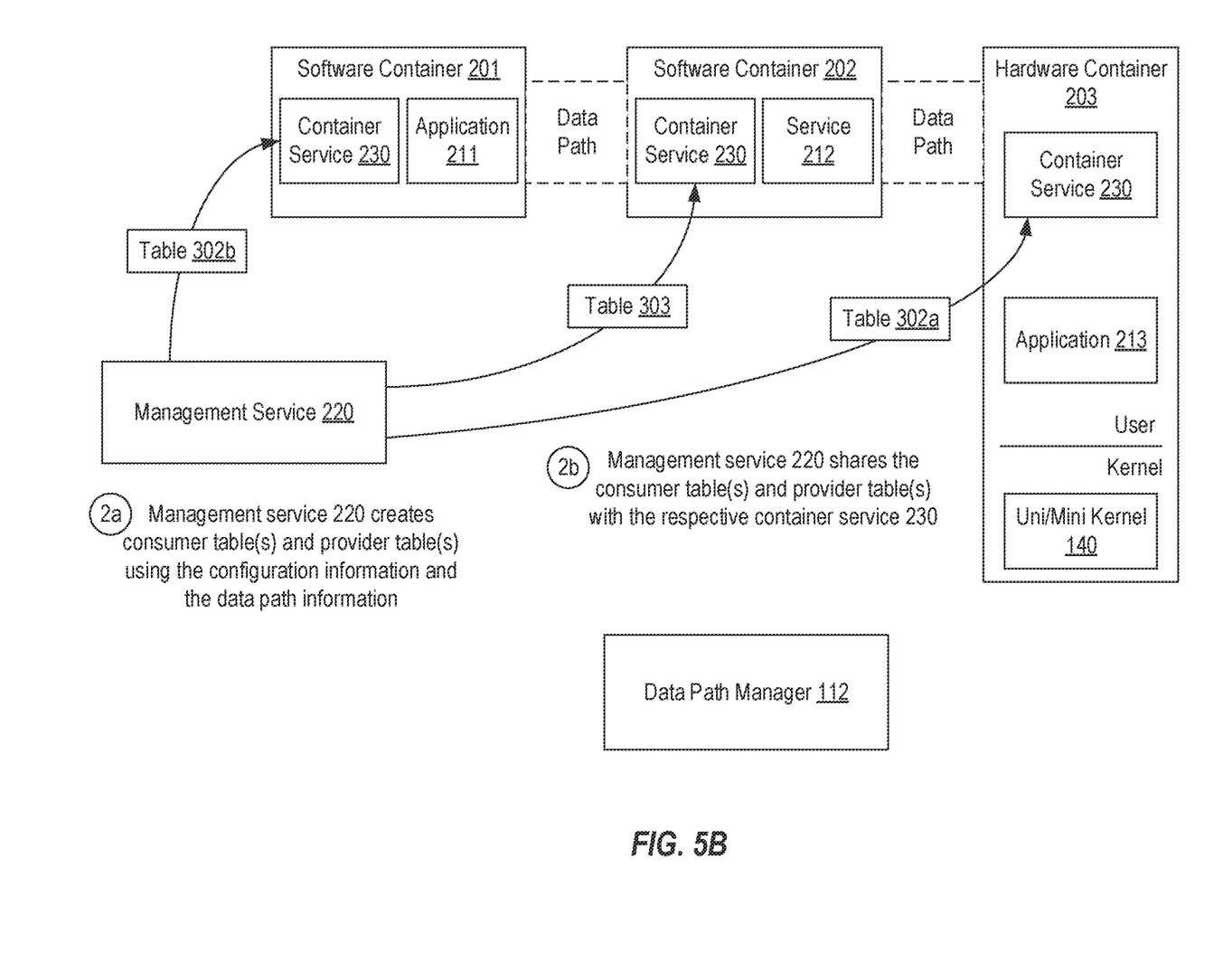

Turning to FIG. 5B, in step 2a, management service 220 can use the configuration information and the data path information to create a consumer table for each containerized application or service that is a provider and a provider table for each containerized application or service that is a consumer. In other words, management service 220 can create a table for each containerized application or service that is a consumer which describes how the corresponding container service 330 can communicate with each provider on which the containerized application or service depends. Likewise, management service 220 can create a table for each containerized application or service that is a provider which describes how the corresponding container service 330 can communicate with each consumer that depends on the containerized application or service. Notably, a consumer would typically be a containerized application and a provider would typically be a containerized service, but that need not always be the case.

With reference to FIG. 3, management service 220 may create a provider table 302a for the game application (application 213) that identifies the GPU-Lib service as a provider that is deployed in a software container and includes the data path information, such as an IP address and port or a pipe address, at which communications targeting the GPU-Lib service can be sent (i.e., the data path information pertaining to software container 202's endpoint of the data path between software container 202 and hardware container 203). For example, the data path information defined in table 302a could be the IP address and port of the ambassador created for software container 202. Provider table 302a may also identify the APIs that the GPU-Lib service exports. Management service 220 may create provider table 302b to include similar information for Adobe Creative Cloud (application 211). Additionally, because Adobe Creative Cloud depends on the X11 service that is part of OS kernel services 111, management service 220 may include an appropriate entry in provider table 302b for this service (e.g., by providing data path information which defines the IP address and port or pipe address at which management service 220 receives requests to invoke APIs of the X11 service).

Management service 220 may create a consumer table 303 for the GPU-Lib service (service 212) which identifies both the game application and Adobe Creative Cloud as consumers, provides the data path information for communicating with their respective containers and identifies the APIs of the GPU-Lib service that each consumer imports (or depends upon).

In step 2b, management service 220 can share each consumer table and provider table with the instance of container service 230 in the respective container. For example, management service 220 can send table 302a to the instance of container service 230 running in hardware container 203, table 302b to the instance of container service 230 running in software container 201 and table 303 to the instance of container service 230 running in software container 202. At this point, the instance of container service 230 in software container 201 will know which APIs need to be exported (i.e., which APIs Adobe Creative Cloud (application 211) depends upon that are available external to software container 201) as well as how it may communicate to export these APIs. Similarly, the instance of container service 230 in hardware container 203 will know which APIs need to be exported (i.e., which APIs the game application (application 213) depends upon that are available external to hardware container 203) as well as how it may communicate to export these APIs. Additionally, the instance of container service 230 in software container 202 will know which APIs need to be imported (i.e., which APIs other containerized applications depend upon) as well as how it may communicate to import these APIs.

Figure 5C:
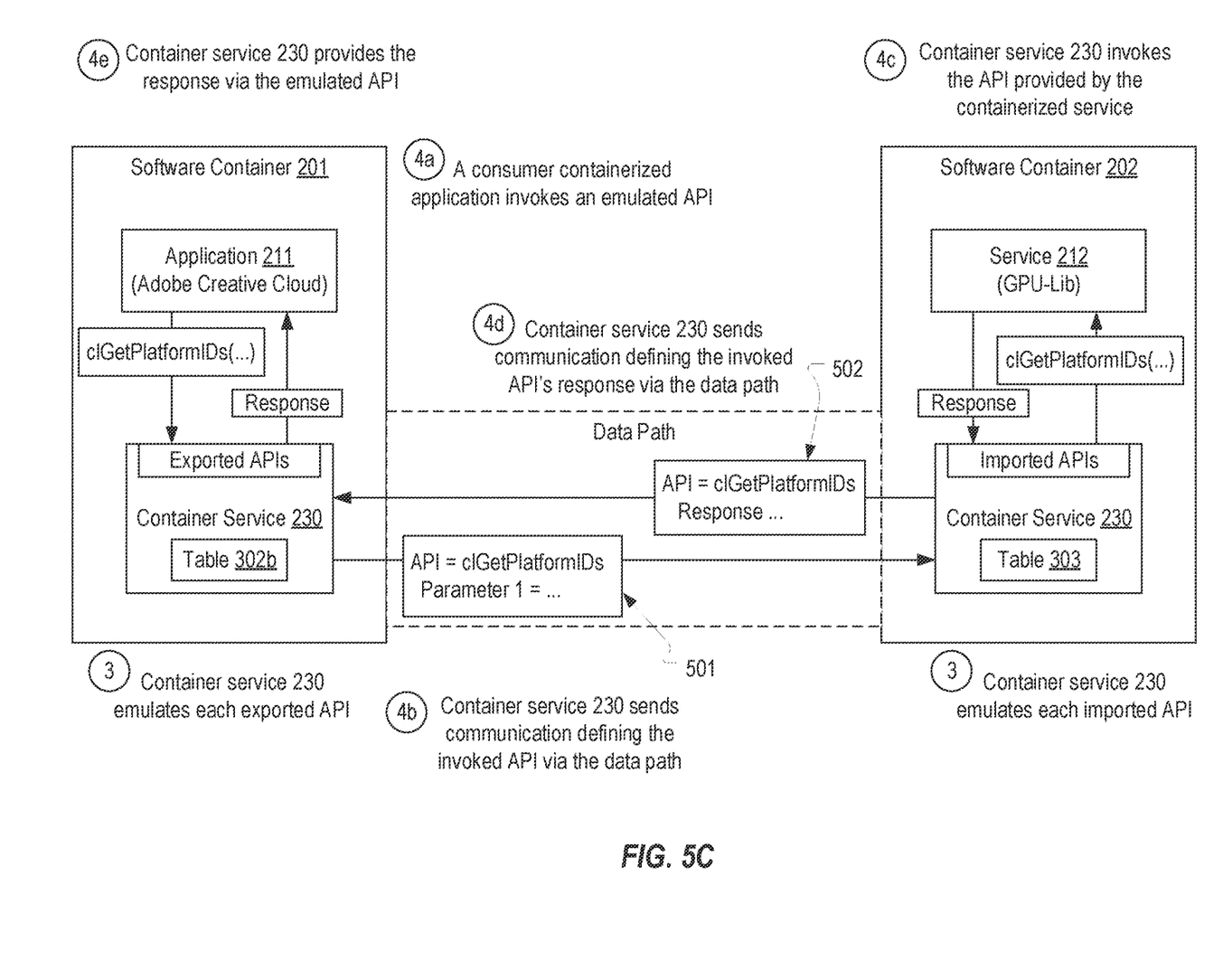

FIG. 5C provides an example of how container service 230 in software container 201 and container service 230 in software container 202 can emulate APIs as well as how they can communicate when such emulated APIs are invoked. In step 3, each container service 230 can emulate APIs in accordance with the respective provider table 302b and consumer table 303. In the case of container service 230 running in software container 201, it can emulate each exported API defined in provider table 302b. In this context, emulating an exported API can entail enabling application 211 to call the exported API in a typical fashion. In other words, from application 211's perspective, it will appear as if service 212 is running in software container 201. In the case of container service 230 running in software container 202, it can emulate each imported API defined in consumer table 303. In this context, emulating an imported API can entail creating functionality for invoking the API that service 212 provides.

With the exported APIs emulated in software container 201 and the imported APIs emulated in software container 202, application 211 can function in a typical fashion by calling any of the exported APIs while container services 230 can abstract the fact that service 212 is external to software container 201. For example, in step 4a, it is assumed that application 211 invokes the clGetPlatformIDs API that container service 230 emulates in software container 201. In step 4b, container service 230 in software container 201 can use the data path to send a communication 501 that defines the invoked API. For example, if the data path is established using ambassadors, communication 501 could be in the form of an HTTP request (or another suitable protocol) that identifies the name of the API and the values of each parameter and that is sent to the IP address and port where the ambassador for software container 202 is listening. Alternatively, with other types of data paths, communication 501 could be in the form of a remote procedure call or other suitable technique.

In response to receiving communication 501, in step 4c, container service 230 in software container 202 can invoke the identified API, clGetPlatformIDs, using the parameters specified in communication 501. Service 212, as the provider of this API, will handle the invocation and provide a response in a typical manner. However, the response will be provided to container service 230 in software container 202 which in turn can send a communication 502 defining the response via the data path in step 4d. For example, again assuming the data path is established using ambassadors, communication 502 could be in the form of an HTTP request that is sent to the IP address and port where the ambassador for software container 201 is listening. Finally, in step 4e, container service 230 in software container 201 can use the response in communication 502 to complete application 211's invocation of the API. In this way, embodiments of the present invention enable a containerized application to automatically and seamlessly use containerized services that are hosted in a separate container regardless of the type of the separate container.

Figure 5D:
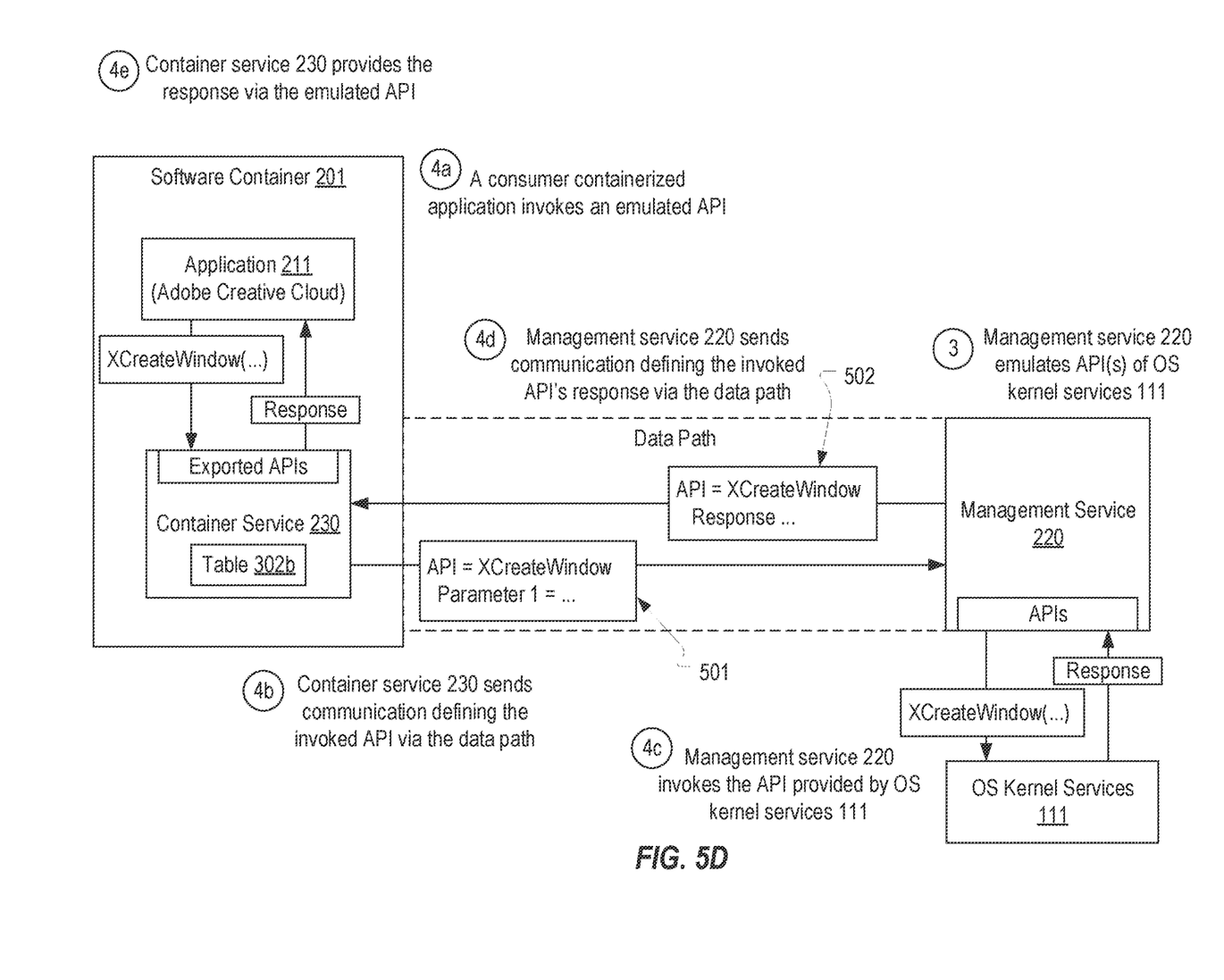

FIG. 5D provides an example showing that a similar process can be performed when the invoked API is provided by OS kernel services 111. In such a case, step 3 may entail management service 220 emulating API(s) that OS kernel services 111 provides (i.e., creating functionality for invoking API(s) of OS kernel services 111). Steps 4a-4e can be generally the same with the exception that management service 220 is the endpoint of the data path. In this way, embodiments of the present invention enable a containerized application to automatically and seamlessly use OS kernel services 111.

Embodiments of the present invention enable multiple versions of the same containerized service or application to be deployed on computing device 100 at the same time. For example, one container could be used to host a first version of the GPU-Lib and another container could be used to host a second version of the GPU-Lib. In such cases, the above-described techniques could be used to determine which version of the GPU-Lib a particular containerized application should be dependent upon and can automatically create the data path to connect the containerized application with that version. For example, container service 230 and/or management service 220 could implement semantic versioning techniques as part of creating table 301 to thereby identify the most appropriate version of the GPU-Lib (or other dependency) for each containerized application.

In some embodiments, management service 220 may be configured to prevent certain APIs that a containerized service or OS kernel services 111 provide from being included in a provider table for a particular consumer containerized application. For example, if Adobe Acrobat is a containerized application and is dependent on a SmartCard service that is a containerized service in a separate container, management service 220 may include only the SCardSetAttrib and SCardWriteCache APIs in the provider table created for Adobe Acrobat. In this way, the instance of container service 230 running in the same container as Adobe Acrobat would emulate only these two APIs thereby preventing Adobe Acrobat from obtaining access to any other API that the SmartCard service may provide.

In summary, embodiments of the present invention enable a containerized service to be isolated in a container while remaining discoverable and accessible to containerized applications in other containers. Embodiments of the present invention may also or alternatively enable a service provided by the host operating system to remain discoverable and accessible to containerized applications.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media are categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similar storage medium which can be used to store desired program code means in the form of computer-executable instructions or data structures and which can be accessed by a general purpose or special purpose computer. Transmission media include signals and carrier waves. Because computer storage media and transmission media are disjoint categories, computer storage media does not include signals or carrier waves.

Computer-executable instructions comprise, for example, instructions and data which, when executed by a processor, cause a general-purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, smart watches, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for managing services across containers comprising:
    identifying a first containerized application that is hosted in a first container;
    identifying a containerized service that is hosted in a second container;
    receiving configuration information from a container service running in the first container;
    determining from the configuration information that the first containerized application is dependent on the containerized service; and
    creating a data path between the container service running in the first container and the second container to thereby enable the first containerized application to use the containerized service by:
    providing, to the container service running in the first container, an identification of one or more APIs that the containerized service provides and data path information for a data path by which the container service running in the first container can request that the one or more APIs be invoked; and
    emulating, by the container service running in the first container, the one or more APIs that the containerized service provides;
    in response to the first containerized application invoking a first API of the one or more emulated APIs, sending a first communication via the data path to the containerized service;

sending, by the containerized service, a second communication via the data path to the container service running in the first container, the second communication including a response to the invocation of the corresponding first API; and providing, by the container service running in the first container, the response to the first containerized application.

2. The method of claim 1, wherein determining that the first containerized application is dependent on the containerized service comprises accessing configuration information.

3. The method of claim 2, wherein the configuration information is received from a management server.

4. The method of claim 1, wherein the container service running in the first container obtains the configuration information by inspecting the first containerized application.

5. The method of claim 4, wherein inspecting the first containerized application comprises inspecting an import address table or a manifest of the first containerized application.

6. The method of claim 1, wherein determining that the first containerized application is dependent on the containerized service further comprises receiving configuration information from a container service running in the second container.

7. The method of claim 6, wherein the container service running in the second container obtains the configuration information by inspecting the containerized service.

8. The method of claim 7, wherein inspecting the containerized service comprises inspecting an export address table or a manifest of the containerized service.

9. The method of claim 1, further comprising:
determining that the first containerized application is dependent on a service provided by a host operating system; and
creating a data path between the first container and the service provided by the host operating system to thereby enable the first containerized application to use the service provided by the host operating system.

10. The method of claim 1, further comprising:
identifying another version of the containerized service that is hosted in a third container;
wherein determining that the first containerized application is dependent on the containerized service comprises using semantic versioning to determine that the first containerized application should not be dependent on the other version of the containerized service.

11. The method of claim 1, wherein creating the data path between the first container and the second container to thereby enable the first containerized application to use the containerized service comprises:
restricting the first containerized application from using a second set of one or more APIs that the containerized service provides.

12. The method of claim 1, further comprising:
identifying a second containerized application that is hosted in a third container;
determining that the second containerized application is dependent on the containerized service; and
creating a second data path between the third container and the second container to thereby enable the second containerized application to use the containerized service.

13. One or more computer storage media storing computer executable instructions which when executed implement a method for managing services across containers comprising:
identifying a first containerized application that is hosted in a first container;
identifying a containerized service that is hosted in a second container;
receiving configuration information from a container service running in the first container;
determining from the configuration information that the first containerized application is dependent on the containerized service; and
creating a data path between the container service running in the first container and the second container to thereby enable the first containerized application to use the containerized service by:
providing, to the container service running in the first container, an identification of one or more APIs that the containerized service provides and data path information for a data path by which the container service running in the first container can request that the one or more APIs be invoked; and
emulating, by the container service running in the first container, the one or more APIs that the containerized service provides;
in response to the first containerized application invoking a first API of the one or more emulated APIs, sending a first communication via the data path to the containerized service;
sending, by the containerized service, a second communication via the data path to the container service running in the first container, the second communication including a response to the invocation of the corresponding first API; and
providing, by the container service running in the first container, the response to the first containerized application.

14. The computer storage media of claim 13, wherein determining that the first containerized application is dependent on the containerized service comprises accessing configuration information.

15. The computer storage media of claim 14, wherein the configuration information is received from a management server.

16. The computer storage media of claim 13, wherein the container service running in the first container obtains the configuration information by inspecting the first containerized application.

17. The computer storage media of claim 16, wherein inspecting the first containerized application comprises inspecting an import address table or a manifest of the first containerized application.

18. The computer storage media of claim 13, wherein determining that the first containerized application is dependent on the containerized service further comprises receiving configuration information from a container service running in the second container.

19. The computer storage media of claim 18, wherein the container service running in the second container obtains the configuration information by inspecting the containerized service.

20. The computer storage media of claim 19, wherein inspecting the containerized service comprises inspecting an export address table or a manifest of the containerized service.

* * * * *